No. 851,921. PATENTED APR. 30, 1907.
H. CRUSE.
SPINDLE OF TEXTILE MACHINES.
APPLICATION FILED MAR. 26, 1906.
2 SHEETS—SHEET 1.
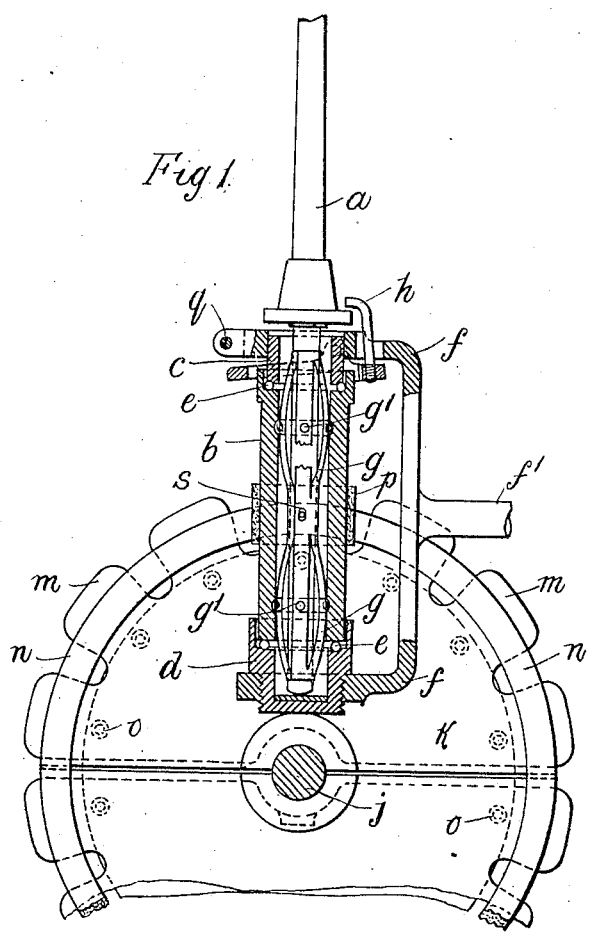
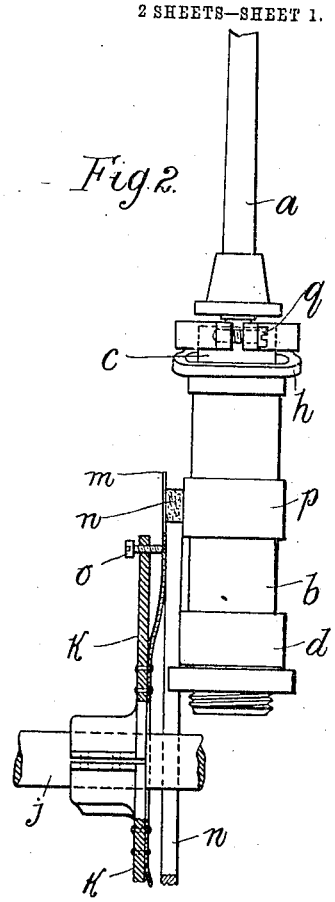
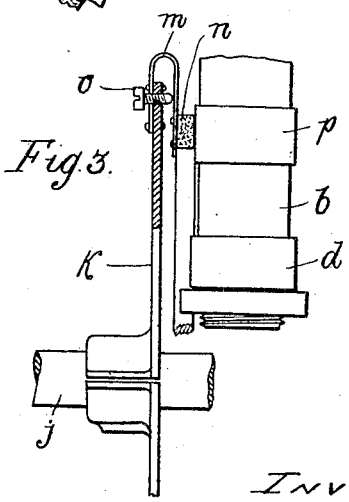
WITNESSES
W. P. Burke
INVENTOR
Henry Cruse
By Richards
ATT'YS.

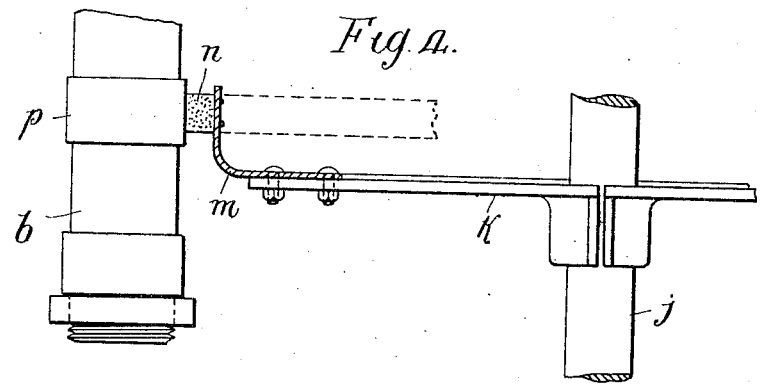
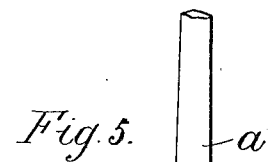
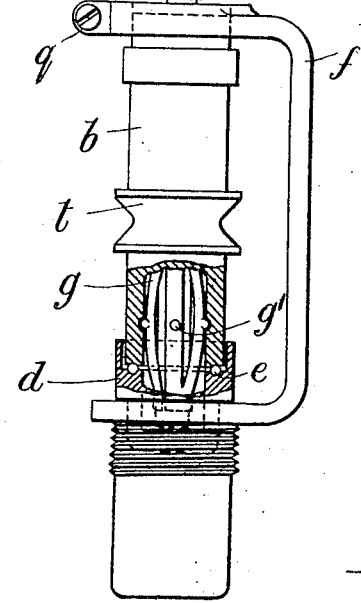

UNITED STATES PATENT OFFICE.

HENRY CRUSE, OF BLACKLEY, MANCHESTER, ENGLAND.

SPINDLE OF TEXTILE-MACHINES.

No. 851,921.      Specification of Letters Patent.      Patented April 30, 1907.

Application filed March 26, 1906. Serial No. 308,077.

*To all whom it may concern:*

Be it known that I, HENRY CRUSE, a subject of Great Britain, residing at Blackley, Manchester, in the county of Lancaster, England, engineer, have invented new and useful Improvements in and Relating to the Spindles of Textile-Machines, of which the following is a specification.

My invention relates to the spindles of textile machines and has for its objects to minimize friction in the spindle bearings, to reduce the amount of driving power required and to increase the steadiness in running.

In carrying my improvements into effect I form the spindle of any suitable size and shape and I mount it in a sleeve or bolster supported on ball bearings between two arms or carrier brackets secured to a bolster rail or equivalent part. These arms terminate in rings which have annular grooves on the faces adjoining the sleeve and the corresponding faces of the sleeve have similar grooves forming ball races in which are placed two series of balls upon which the sleeve is free to be rotated.

The ring on the upper arm is open and the ring on the lower arm is closed and in it is formed a footstep to receive the foot of the spindle which is passed down through the upper ring and through the sleeve into the footstep. The spindle is connected to the sleeve not positively but indirectly by means of a balloon shaped or other suitably shaped spring or springs compressed and confined between the spindle and the interior of the sleeve or in place of the spring or springs I may employ any other suitable elastic cushion to insure the rotation of the spindle with the sleeve. The sleeve may be driven in any convenient manner but preferably and according to my invention it is driven frictionally by a disk secured upon a hollow or other shaft placed below the bolster bearing and in contact with a collar of leather or other suitable material fixed upon the sleeve, say at about mid-length. The friction disk is by preference formed of metal the edge of which is in-turned so as to overhang the body of the disk and is slit at intervals to give it elasticity and on this in-turned edge I mount a ring of leather or other suitable material to form a friction surface which makes contact with the friction collar on the sleeve; consequently when the shaft is driven which it may be in any convenient way, each friction disk secured upon it drives a sleeve or more than one sleeve and so gives motion to a spindle, or spindles. I provide the necessary openings or grooves to form oil passages for the lubrication of the ball bearings and spindle footstep.

In the accompanying two sheets of drawings—Figure 1 is a sectional elevation of my improved spindle. Fig. 2 is an elevation taken at right angles to Fig. 1. Figs. 3 and 4 are similar views to Fig. 2 but show alternative modes of mounting the friction driving ring. Fig. 5 is an elevation of my improved spindle as arranged for band driving instead of friction driving.

Referring first to Figs. 1 and 2,—$a$ designates the spindle; $b$ the sleeve or bolster; $c$ the top open ring; $d$ the bottom closed ring or footstep; $e$ the balls carried in races formed by grooves in the contiguous surfaces of the sleeve or bolster and the top and bottom rings; $f$ the arms forming a carrier bracket secured by the shank $f'$ or in any other convenient way to a bolster rail or other part, not shown; $g$ the balloon shaped springs compressed between the spindle and the interior of the sleeve or bolster; $h$ an ordinary gravity holding down catch or device for preventing the withdrawal of the spindle while doffing; $j$ the shaft driven in any convenient manner; $k$ the friction disk secured thereon; $m$ a spring metal ring riveted to the disk; $n$ the leather or other suitable ring forming a friction surface and $o$ screws passing through the disk and bearing on the metal ring $m$ in order to press its friction ring $n$ into contact with the friction collar $p$ on the sleeve. The ring $d$ forming the spindle footstep is screwed into or otherwise secured in the lower carrier arm $f$ while the upper ring $c$ is held in a clip formed in the upper carrier arm and closed by a screw $q$. Any convenient method of connecting the balloon shaped springs $g$ to the spindle may be employed as for example a pin $s$ in the spindle may project into a slot or hole in the spring and projections $g'$ on the spring may engage grooves in the interior of the sleeve or bolster, as shown, if required but in practice such projections and grooves may not be necessary. Again, instead of the balloon shaped or other shaped springs I may employ any other suitable form of elastic cushion to form the connection between the spindle and the sleeve or bolster.

In Fig. 3 the spring metal $m$ carrying the friction surface $n$ is shown attached to the outer edge of the disk $k$ and bent over and back to the inner side but in all other respects the arrangement is the same as that already described.

In Fig. 4 the friction disk $k$ is shown mounted horizontally upon a vertical shaft or spindle $j$ this arrangement enabling the friction surface $n$ to drive more than one spindle simultaneously.

In Fig. 5 the spindle $a$ is mounted in its sleeve or bolster $b$ supported on ball bearings as already described; but in this case instead of friction driving a wharf $t$ is shown formed on the sleeve or bolster to enable it to be driven by a band.

I wish it to be clearly understood that the drawings merely illustrate examples of some out of many arrangements and constructions which could be adopted without departing from the characteristic features of my invention which consists essentially in mounting the spindle in a sleeve or bolster supported preferably on ball bearings and driven preferably by friction the spindle being connected but not positively, to the interior of the sleeve or bolster by a suitable form of spring or elastic cushion connection.

What I claim and desire to secure by Letters Patent of the United States is—

The combination with a spindle, of a bolster surrounding the spindle, springs placed between the spindle and bolster and bearing against each, and means for rotating the bolster.

In testimony whereof I have signed my name to this specification in the presence of two subscribing witnesses.

HENRY CRUSE.

Witnesses:
H. B. BARLOW,
S. D. GILLETT.